United States Patent
Brome et al.

(10) Patent No.: US 7,427,231 B2
(45) Date of Patent: Sep. 23, 2008

(54) MOTOR OVERSPEED DETECTION

(75) Inventors: John G. Brome, Delavan, WI (US); Yun-Ren Ho, Naperville, IL (US)

(73) Assignee: CNH America LLC, New Holland, PA (US)

(*) Notice: Subject to any disclaimer, the term of this patent is extended or adjusted under 35 U.S.C. 154(b) by 490 days.

(21) Appl. No.: 11/036,006

(22) Filed: Jan. 14, 2005

(65) Prior Publication Data

US 2006/0156715 A1    Jul. 20, 2006

(51) Int. Cl.
 *A01D 75/18* (2006.01)
(52) U.S. Cl. ............................................ 460/1; 460/6
(58) Field of Classification Search .................. 460/1, 460/6, 59, 116, 149; 56/10.2 R, 10.2 G, 10.2 H, 56/10.5
See application file for complete search history.

(56) References Cited

U.S. PATENT DOCUMENTS

| | | | |
|---|---|---|---|
| 5,527,218 A * | 6/1996 | Van den Bossche et al. | 460/20 |
| 5,865,700 A | 2/1999 | Horsch | |
| 6,247,295 B1 | 6/2001 | Hansen | |
| 6,695,693 B2 | 2/2004 | Ho et al. | |
| 6,702,666 B2 | 3/2004 | Ho et al. | |
| 6,726,560 B2 * | 4/2004 | Ho et al. | 460/59 |

* cited by examiner

*Primary Examiner*—Thomas B Wil
*Assistant Examiner*—Alicia Torres
(74) *Attorney, Agent, or Firm*—Michael G. Harms; John William Stader; Patrick M. Sheldrake

(57) ABSTRACT

A motor control system of a combine having a rotor that is simultaneously driven by an engine and a hydraulic motor is configured to determine at overspeed condition of the motor and to disengage the motor from the engine when the overspeed condition exists.

11 Claims, 3 Drawing Sheets

MOTOR OVERSPEED DETECTION

CROSS-REFERENCE TO RELATED APPLICATIONS

The present application is related to U.S. patent application Ser. No. 10/166,951, now issued as U.S. Pat. No. 6,695,693; to U.S. patent application Ser. No. 10/166,916, now issued as U.S. Pat. No. 6,702,666; to U.S. patent application Ser. No. 10/167,310 from which this application claims priority as a continuation-in-part application, and to U.S. patent application Ser. No. 10/199,681 from which this application also claims priority as a continuation-in-part application.

FIELD OF THE INVENTION

The invention relates to agricultural combines and systems for controlling their operation. More particularly, it relates to control systems for controlling the speed of hydraulic motors that drive combine rotors. Even more particularly, it relates to control systems that prevent the overspeeding of hydraulic motors that drive combine rotors.

BACKGROUND OF THE INVENTION

Agricultural combines or "combine harvesters" are well-known for harvesting crops such as corn, soybeans, and wheat. The typical combine includes a self-propelled chassis supported on the ground via driving and driven wheels. A replaceable harvesting head is mounted on the front of the chassis for harvesting the crop of interest. The combine is operable to feed the harvested grain from the head to an internal threshing and separating system that separates the grain from stalks, pods, cobs, etc. (collectively referred to herein as "chaff") and that transfers the grain to an on-board storage hopper. The stored grain can be periodically transferred to a wagon or the like by an auger mounted on the chassis adjacent the storage hopper.

The threshing and separating system of the typical combine includes at least one threshing rotor, a concave, a grain pan, sieves and fans. Of these components, the rotor is of the most importance for purposes of the present invention. (The rotor(s) will hereafter be referred to in the singular for the sake of convenience, it being understood that the problems addressed by the invention, and the invention itself, are equally applicable to single rotor and multiple rotor systems). Torque is typically transferred to the rotor directly from the engine by a belt drive system that is engaged by a mechanical clutch. However, in order to increase the amount of crop processed by the combine, the size, weight and power consumption of the rotor are being increased to levels above the tolerances of belt driven technology. It is difficult to accelerate such a rotor from rest, particularly under certain crop conditions, because accelerating the high-inertia rotor places high stresses on both the belt drive and the clutch used to engage the belt drive. The loads imposed on the rotor after it is accelerated up to speed also can vary dramatically. The stress on the clutch and belt can be severe, resulting in early clutch and belt failure. Additionally, there are instances in which the combine encounters a "slug" condition in which the operator may determine that the crop is lodged between the rotor and concave. It may be desirable in this situation to permit the operator to control the rotor to reverse the direction of rotor rotation to deslug the rotor.

So-called "split-torque" or "hydro-mechanical" transmissions have been proposed to address these and other problems encountered when driving a threshing rotor. For instance, U.S. Pat. No. 5,865,700 to Horsch discloses a hydro-mechanical drive system including an engine and a hydrostatic motor which derives its power from the engine. A single clutch controls the input of the engine power and input of the hydrostatic motor power. As another example, U.S. Pat. No. 6,247,695 to Hansen discloses a combine in which an engine drives a wet clutch and a hydrostatic motor. U.S. Pat. Nos. 6,695,693 and 6,702,666 to Ho, Brome, and Bundy disclose a combine with a dual path drive system in which an engine drives the rotor through two paths: a hydraulic pump/motor path and a direct gear train path.

In the latter two patents, the two paths are joined at a planetary gear box, with the engine coupled to and directly driving a ring gear, and the hydraulic motor coupled to a sun gear. The output planetary gears are coupled to the rotor through a gearbox. A microprocessor controls the speed of the rotor primarily by regulating the speed of the hydraulic motor driving the sun gear. In the preferred arrangement, the engine runs at a constant, optimum speed at which it is most efficient. An electronic controller connected to a rotor speed sensor is configured to vary the speed of the hydraulic motor until the rotor is operating at its optimum speed as well.

While the addition of a motor to permit gradual acceleration does reduce damage to a belt, it also adds an additional components—the hydraulic motor—that itself is susceptible to damage under extreme operating conditions.

When a split torque system is subjected to severe and sudden loading, the driving torque applied to the rotor shaft by the engine and the motor rises extremely fast and extremely high as the rotor resists further rotation. This sudden increase in torque causes a corresponding increase in hydraulic pressure in the hydraulic lines providing the motor with hydraulic fluid. If this increase in hydraulic pressure is great enough, it will cause the pressure relief valve coupled to the hydraulic lines to open and the motor to overspeed.

Once the pressure reaches this threshold and the hydraulic conduits open, the motor can be accelerated by the applied torque to speeds outside its normal operating range, speeds that may damage the motor itself.

For example, a typical hydraulic motor driving a combine rotor operates at speeds of about +4000 to -4000 rpm. These motors are typically damaged when their speeds reach 5000-6000 rpm, for example. When a rotor is slugged, the sudden increase in engine torque applied to the motor shaft can open the pressure relief valve and accelerate the motor to speeds of 7000-10,000 rpm in the space of just a few seconds. When extreme motor overspeed occurs, the operator must immediately stop harvesting with the combine, and have the motor inspected, overhauled and/or replaced as necessary. This inspection and repair process can take days. Farmers will not tolerate a combine that is broken down for days during the harvesting season.

One way of preventing motor overspeed is to electronically monitor a motor speed sensor and disengage the motor from its load when it reaches an overspeed limit that is below a motor-damaging speed.

One difficulty with this solution is that the speed signal provided by the motor speed sensor has a significant noise component. It can vary substantially from sensor reading to sensor reading, sometimes indicating a speed that is higher than the true motor speed and sometimes indicating a speed that is lower than the true motor speed.

Disengaging the motor based on a signal from the speed sensor may generate too many false positives and false negatives. A "false-positive" is when the sensor indicates the motor is over speeding and it is not. A "false negative" is when the motor speed sensor does not indicate the motor is over speeding and it is. False positives are problem because of the delay in harvesting. When the engine is disconnected and the rotor is shut, the operator must immediately stop the combine, climb out, and inspect the drive system to see whether the rotor is slugged. This takes time. False negatives are problem because of the damage to the motor. If the system does not sense the motor overspeed condition, the motor can be damaged. This, too, delays harvesting.

What is needed, therefore, is an improved method and apparatus for detecting motor speed that decreases the false positives and the false negatives. It is an object of this invention to provide such a method and apparatus.

SUMMARY OF THE INVENTION in accordance with a first aspect of the invention a motor control system for a combine having a hydraulic motor and an internal combustion engine that are configured to be simultaneously coupled to and simultaneously drive a combine rotor is provided, the system comprising at least one electronic controller configured (1) to calculate at least two alternative motor speeds, (2) to compare the two alternative motor speeds with at least one threshold motor speed, and (3) to disengage the motor from the engine when both alternative motor speeds exceed the threshold motor speed for a predetermined interval.

The electronic controller may calculate a first of the two alternative motor speeds based upon a signal from a motor speed sensor. The electronic controller may calculate a second of the two alternative motor speeds based upon signals from an engine speed sensor and a rotor speed sensor. The combine may further include a planetary gear set coupling the engine and motor to the rotor, and a clutch coupled to and between the engine and the planetary gear set. The control system may be configured to disengage the motor from the engine by disengaging the clutch. The at least one threshold motor speed may include a first threshold motor speed and a second threshold motor speed, and the at least two alternative motor speeds may include a first motor speed and a second motor speed, and the electronic controller may be configured to compare the first motor speed with the first threshold motor speed and may be configured to compare the second motor speed with the second threshold motor speed. The electronic controller may be configured to prevent disengagement of the motor when a clutch is slipping.

In accordance with a second aspect of the invention, a method for controlling motor overspeed in a combine having a hydraulic motor and an internal combustion engine that are configured to be simultaneously coupled to and simultaneously drive a combine rotor, the method comprising the steps of: electronically calculating at least two alternative motor speeds; electronically comparing the two alternative motor speeds with at least one threshold motor speed, and disengaging the motor from the engine when both alternative motor speeds exceed the threshold motor speed for a predetermined interval.

The method may further include a step of electronically calculating a first of the two alternative motor speeds based upon a signal from a motor speed sensor. The method may further include a step of electronically calculating a second of the two alternative motor speeds based upon signals from an engine speed sensor and a rotor speed sensor. The combine may include a planetary gear set coupling the engine and motor to the rotor and a clutch coupled to and between the engine and the planetary gear set. The step of disengaging the motor may include the step of disengaging the clutch. The at least one threshold motor speed may include a first threshold motor speed and a second threshold motor speed, and further wherein the at least two alternative motor speeds may include a first motor speed and a second motor speed, and further wherein the step of comparing the two alternative motor speeds with at least one threshold motor speed may include the step of comparing the first motor speed with the first threshold motor speed and comparing the second motor speed with the second threshold motor speed. The method may include a step of preventing disengagement of the motor when a clutch is slipping.

In accordance with a third aspect of the invention, a motor control system for a combine having a hydraulic motor and an internal combustion engine that are configured to be simultaneously coupled to and simultaneously drive a combine rotor is provided, the system including means for calculating at least two alternative motor speeds, means for comparing the two alternative motor speeds with at least one threshold motor speed, and means for disengaging the motor from the engine when both alternative motor speeds exceed the threshold motor speed for a predetermined interval.

The system may further include means for calculating a first of the two alternative motor speeds based upon a signal from a motor speed sensor. The system may further include means for calculating a second of the two alternative motor speeds based upon signals from an engine speed sensor and a rotor speed sensor. The combine may include a planetary gear set coupling the engine and motor to the rotor, and a clutch coupled to and between the engine and the planetary gear set. The system may further include means for disengaging the motor from the engine by disengaging the clutch. The at least one threshold motor speed may include a first threshold motor speed and a second threshold motor speed, and further wherein the at least two alternative motor speeds may include a first motor speed and a second motor speed, and the system may further include means for comparing the first motor speed with the first threshold motor speed and means for comparing the second motor speed with the second threshold motor speed.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
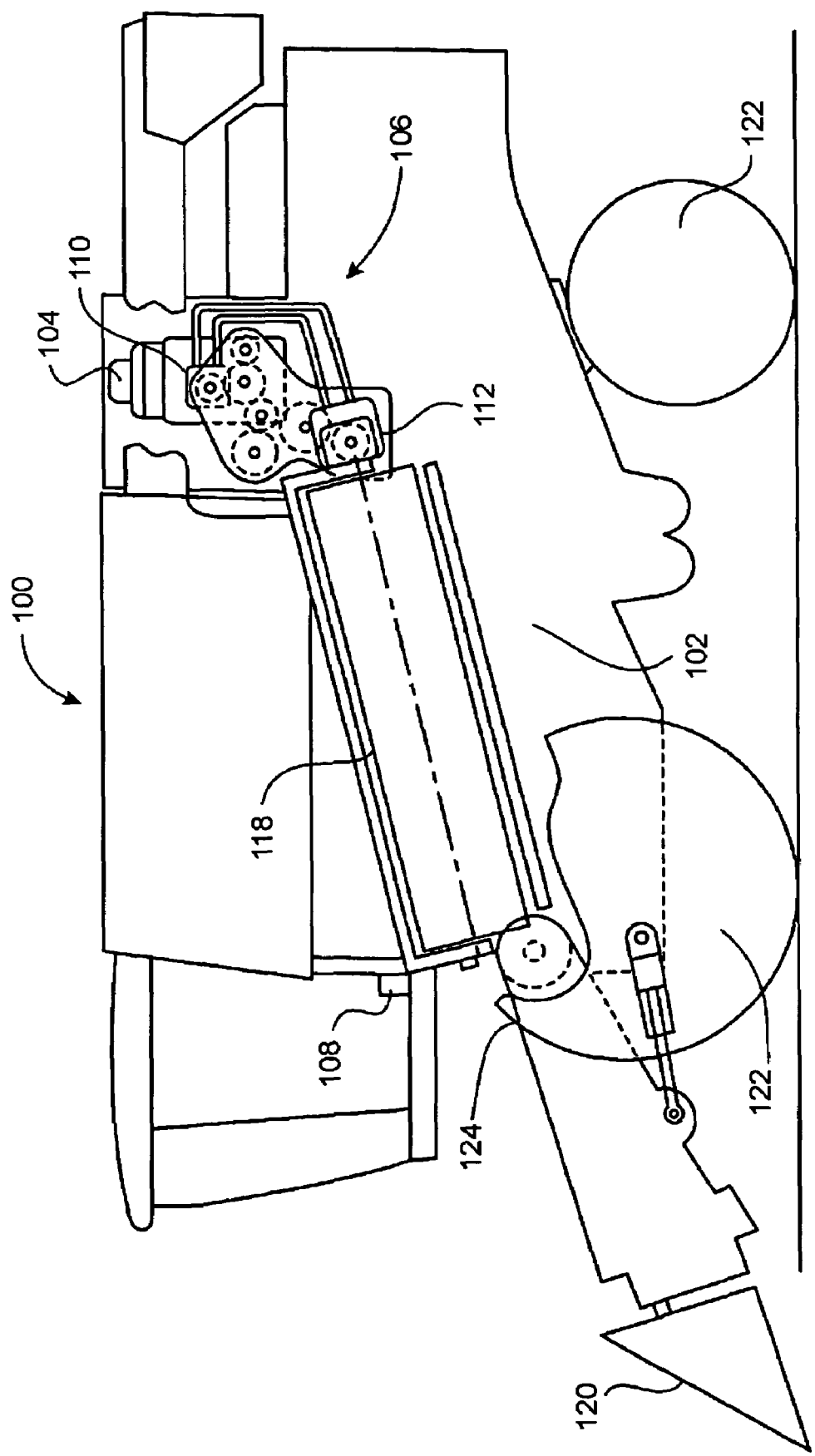
FIG. 1 is a side schematic view of an agricultural combine having a rotor drive system in accordance with the present invention.
Figure 2:
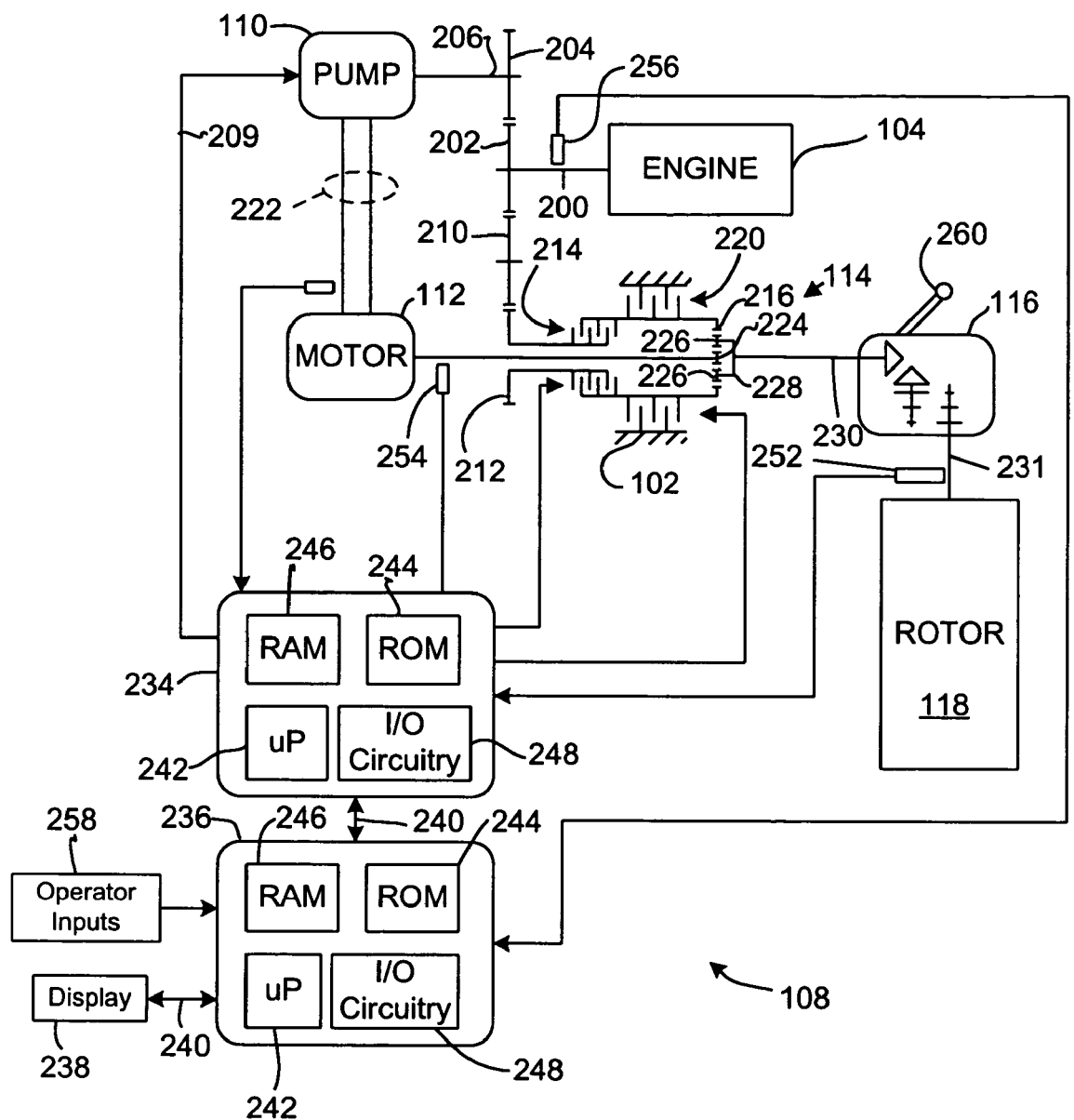
FIG. 2 is an electrical, hydraulic and mechanical schematic diagram of the rotor drive system of FIG. 1 showing the electronic control system that controls its operation.

Referring to FIGS. 1 and 2, a work vehicle is illustrated, here shown as an agricultural combine 100. The work vehicle has a chassis 102 on which an engine 104 is mounted. A drive system 106 is coupled to and driven by engine 104 to rotate rotor 118. An electronic control system 108 is coupled to the engine and the drive system to monitor various sensors, to control the engine and to control the drive system.

The engine 104 is preferably an internal combustion engine, such as a multi-cylinder gasoline or diesel engine.

The drive system 106 includes a hydraulic pump 110 that is coupled to and driven by the engine, a hydraulic motor 112 that is fluidly coupled to and driven by pump 110, gear trains coupling engine 104 to the pump, engine 104 to a planetary gear arrangement, the planetary gear arrangement itself, and a gearbox driven by the planetary gear arrangement that, in turn, drives the combine rotor 118.

Rotor 118 rotates with respect to chassis 102 and threshes agricultural material, such as corn or wheat. A header 120 is coupled to the front of the combine chassis to gather the agricultural material from the field and direct it into the rotor. The agricultural material is gathered by the header and cut. Once cut it falls into a header trough that includes an auger. The auger drives the agricultural material toward the mouth of the rotor, which receives and threshes it.

Several wheels 122 are coupled to the chassis to engage the ground and support the combine as it travels over the ground. One or more hydraulic motors (not shown) are coupled to the wheels to drive the wheels in rotation, thereby driving the combine over the ground.

FIG. 2 illustrates construction details of the work vehicle (and particularly the rotor drive system) in a schematic form. Engine 104 has an output shaft 200 to which spur gear 202 is fixed. Gear 202 drives spur gear 204. Spur gear 204 is fixed to shaft 206, which is the input shaft to hydraulic pump 110.

Hydraulic pump 110 is a variable displacement pump in which the specific output can be varied under computer control. In particular, pump 110 has internal electronic actuators that vary the specific displacement of the pump in response to an electrical signal. Controller 234 applies the signal to pump 110 over electrical control lines 209.

Gear 202 also meshes with and drives spur gear 210, which is coupled to and drives the auger and header (not shown). Spur gear 210, in turn, meshes with and drives spur gear 212. Spur gear 212, in turn, is coupled to and drives the input shaft of engine-to-ring clutch 214.

Engine-to-ring clutch 214 is a hydraulically actuated multi-plate clutch that couples gear 212 (and hence engine 104) to ring gear 216 of planetary gear arrangement 114. When clutch 214 is engaged, engine 104 is coupled to and drives ring gear 216. When clutch 214 is disengaged, engine 104 is disconnected from ring gear 216. Engine-to-ring clutch 214 engages engine 104 not only to ring gear 216, but also to motor 112 and rotor 118. When clutch 214 is disengaged, and ring-to-frame clutch 220 is also disengaged, the engine, the motor, and the rotor all turn freely with respect to each other. Engaging ring-to-frame clutch 220 couples motor 112 to rotor 118. Engaging engine to ring clutch 214 engages the engine, the motor, and the rotor to one another to mutually drive (or be driven) by each other. Indeed, during slugging conditions, when the rotor is slugging cannot turn, engine 104 drives motor 112 to a complete stop, and then in a reverse direction.

A second clutch 220 (a ring-to-frame clutch) is coupled to and between ring gear 216 and the frame or chassis 102 (indicated by the ground symbol) to fix the ring gear with respect to the chassis or frame of the vehicle. When clutch 220 is engaged, ring gear 216 is fixed and cannot rotate.

Pump 110 is hydraulically connected to motor 112 by hydraulic conduits 222. These conduits conduct fluid to and from motor 112 to form a closed loop hydraulic (hydrostatic) drive circuit.

Motor 112 is coupled to and drives sun gear 224 of planetary gear arrangement 114. Sun gear 224 drives planet gears 226, which drive planetary gear carrier 228.

Gearbox 116 is a multi-speed gearbox having three manually selectable gear ratios with an input shaft 230 and an output shaft coupled to rotor 118. It is shifted to alternatively select one of the three gear ratios by manual manipulation of gearshift lever 260.

Input shaft 230 of gearbox 116 is fixed to and rotates together with planetary gear carrier 228. The output shaft 231 of multi-speed gearbox 116 is coupled to and drives rotor 118.

It should be clear that power from engine 104 to rotor 118 follows two parallel paths. The first path is from engine 104, though the gearing, through clutch 214, through planet gears 226 and into shaft 230. The second parallel path is from engine 104, through pump 110, through motor 112, through sun gear 224, through the planet gear 226 and into shaft 230.

In a normal mode of operation, power through both paths is provided to the rotor. Engine 104 operates most efficiently at a set and predetermined rpm, yet the rotor cannot be operated at a set, predetermined speed, but must be variable over some range or ranges of speed to harvest the several types of crops it is intended and designed to do.

To provide this variable rotor speed, the parallel power path from engine 104 through pump 110 and motor 112 to the sun gear is provided. The planetary gear arrangement permits power through both paths to be applied to the rotor. The motor drives the sun gear, the engine drives the ring gear. The planetary gear carrier is coupled to and driven by both the sun and ring gears and applies that combined power to the rotor through gearbox 116.

The rotor speed is not varied by varying the engine speed and the ring gear speed, which are constant. The rotor speed is generally varied by controller 234 which varies the motor speed. Controller 234 accomplishes this by varying the specific displacement of pump 110.

Electronics

An electronic control system 108, including three digital controller circuits and their associated sensors, controls the operation of the foregoing machine elements.

The system 108 includes a first digital controller 234, a second digital controller 236 and a third digital controller 238 that are coupled together over a serial communications network, here shown as a CAN bus 240 that operates in accordance with the SAE J1939 communications standard.

Each controller circuit 234, 236, and 238 are similarly constructed, and include a microprocessor 242, a read-only memory (ROM) 244, a random access memory (RAM) 246 and an input/output (I/O) circuit 248. The ROM includes a control program that controls the operation of the controller. The RAM is temporary storage space for numeric values used in computation, and the I/O circuit is configured to process and condition external communication signals including communications with the sensors and the other controllers on the CAN bus 240. Each of these circuits is connected using a data/address/control bus of standard design, which is not shown. The controllers are connected to one another.

The first digital controller 234 is connected to two speed sensors, a rotor speed sensor 252, and a motor speed sensor 254. These sensors are respectively coupled to rotor 118 and motor 112 to sense the rotational speeds of these devices and transmit a signal indicative of those speeds to the first digital controller 234.

The speed sensors in the present system preferably generate a series of pulses as the devices to which they are coupled rotate. The faster the engine, rotor and motor turn, the faster the stream of pulses coming from the sensors arrives at controllers 234 and 236.

Common sensor arrangements that generate such pulse sequences include Hall effect devices and inductive pickups that sense the passage of slotted disks mounted on the shafts of the engine, rotor and motor.

The first digital controller 234 is also connected to and controls three other devices: pump 110, engine-to-ring clutch 214 and ring-to-frame clutch 220. Controller 234 generates and transmits a signal indicative of a desired specific pump displacement to pump 110 over electrical signal lines 209. Pump 110 responsively changes its specific displacement to match the signal. In a similar fashion, controller 234 generates and transmits a clutch-engaging or clutch-disengaging signal to electrical solenoid valves (not shown) that conduct hydraulic fluid to and from the two clutches 214 and 220. The clutches responsively engage and disengage.

The I/O circuit of second digital controller 236 is connected to an engine speed sensor 256 and to operator input device 258. Engine speed sensor 256 generates a signal indicative of the engine speed, typically by generating a pulse train similar to the motor speed sensor. The operator input device is preferably a switch responsive to operator manipulation that generates two separate signals, an "increase speed" signal and a "decrease speed" signal. Controller 236 is also connected to controller 234 and controller 238 via the CAN bus.

The third and final controller, controller 238, is a display controller. It is constructed the same as controller 234 and 236, but is dedicated to displaying data generated by the operator or the other controllers. This capability is provided by its own internal control program stored in its ROM memory. It includes a display device such as an LCD or electroluminescent display. It is coupled to the other controllers over CAN bus 240.

Programming

Controllers 234, 236, and 238 include internal digital control programs that control their operation. These programs are stored in the ROM memory of each controller. The programmed operation of each controller is discussed below.

During normal operation, controller 238 displays several data indicative of the vehicle's status. The first of these, the rotor speed, indicates the speed of the rotor. Controller 234 generates the rotor speed data from the rotor speed signal transmitted to controller 234 from rotor speed sensor 252. Controller 234 periodically calculates the rotor speed from the rotor speed signal and places this information on the CAN bus. The rotor speed is preferably calculated and placed on the CAN bus every 10 milliseconds.

Controller 238 is programmed to receive this rotor speed data over the CAN bus, and to translate them into display signals to drive its integral display. It applies the display signals to the display, thereby generating decimal digits on the display that represent the rotor speed. The display indicates the rotor speed as a sequence of decimal digits expressed in revolutions per minute.

Controller 238 also displays a range of rotor speeds the operator may select among. This range is displayed in the form of an upper and a lower limiting rotor speed. These limits are generated by controller 234 and are transmitted every 10 milliseconds over the CAN bus to controller 238.

Controller 238 receives these speed range signals, translates them into display signals to drive its integral display, and applies the signals to the display thereby generating decimal digits on the display that represent the upper and lower rotor speed limit values. These values are preferably expressed in revolutions per minute.

Controller 236 receives an increase-rotor-speed signal and a decrease-rotor-speed signal (also known as operator speed requests or commands) from operator input device 258. These signals are generated by input device 258 when the operator manipulates device 238. Controller 236 transmits these operator requests on the CAN bus.

Controller 234 receives these operator requests and determines whether or not to change the speed of the rotor in response. If it decides that the rotor speed can be changed, it raises or lowers the commanded (e.g. the target) rotor speed accordingly.

Controller 234 controls the rotor speed by regulating the specific displacement of pump 110. Controller 234 is programmed to execute a conventional feedback control loop that uses the commanded rotor speed (from the operator input device) as an input, and the actual rotor speed (from the rotor speed sensor) as the feedback. The difference between these two speeds is the error signal that is minimized by the feedback control loop. If the rotor is not going at the proper speed, controller 234 changes the pump signal transmitted to the hydraulic pump to either increase or decrease the specific displacement of the pump. Since the engine typically runs at a constant speed, changing the displacement typically changes the hydraulic fluid flow to the motor proportionately, and changes the motor speed proportionately. Controller 234 selects a change in displacement (and hence motor speed) that will increase the rotor speed if the rotor speed is below the command rotor speed and will decrease the rotor speed if the rotor speed is above the command rotor speed.

In an alternative feedback control loop, controller 234 is programmed with one or more lookup tables that are stored in the digital memory of the controller. In this arrangement, the controller determines the speed error (the difference between the command speed of the rotor and the actual speed of the rotor) that uses that value to look up an appropriate signal that should be applied to the pump to change its displacement and eliminate the speed error.

Controller 234 changes the commanded rotor speed based on two things: first, a command by the operator using the operator input device to either raise or lower the current commanded speed, and second, controller 234's determination that the rotor can indeed be driven at the speed requested by the operator. If both conditions are met, controller 234 changes the commanded rotor speed and applies it as an input to the feedback control loop it executes.

Controller 234 also determines whether the motor or the engine (or both) drives the rotor by selectively engaging and disengaging the engine-to-ring clutch 214 and the ring-to-frame clutch 220. In the discussion below, controller 234 transmits engagement and disengagement signals to the hydraulic valve (not shown) that controls the engine-to-ring clutch, causing it to become engaged (thereby connecting the engine to the ring gear) and disengaged (breaking the engine-to-ring gear drive connection). Controller 234 also transmits engagement and disengagement signals to the hydraulic valve (not shown) that controls the ring-to-frame clutch, causing it to engage (locking the ring with respect to the chassis or frame) and disengage (releasing the ring to rotate with respect to the chassis or frame).

In the normal operating mode, both the motor and the engine drive the rotor. In this mode, also called the hydromechanical mode, the engine runs at a relatively constant speed of 2150 rpm which, through the gearing and engine-to-ring clutch 214 connecting the engine to the ring gear, causes the ring gear to rotate at 2188 rpm.

The motor 112 is designed to be bi-directionally driven by pump 110 over a range of speeds from −4077 rpm to +3114 rpm. Given the gear ratios of the planetary gear arrangement, these speeds cause planetary gear carrier 228 to rotate at speeds ranging from 1144 to 2342 rpm.

The rotor cannot be driven at an infinite number of speeds in the normal (hydro-mechanical) mode since the motor has a limited range of operating speeds, the engine operates at a relatively fixed speed, and gearbox 116 has a predetermined set of gear ratios. By "gear ratio" we means the ratio of gearbox input shaft speed versus gearbox output shaft speed. Given these constraints, for any selected gear ratio of gearbox 116, there is an associated and predetermined range of permissible rotor speeds. These speeds are expressed as a rotor speed upper limit and a rotor speed lower limit. Again, each of the selectable gear ratios of gearbox 116 has an associated and different rotor speed upper and lower limit.

The input shaft 230 of gearbox 116 is connected to and driven by the planetary gear carrier 228. The gearbox has three different selectable gear ratios-ratios of gearbox input shaft to output shaft speeds. These gear ratios are selectable by manual operator manipulation of a conventional gearshift lever 260.

Given the gear ratio of the planetary gear arrangement and a ring gear speed of 2188 rpm, input shaft 230 of gearbox 116 rotates at speeds of between 1144 and 2342 rpm; at 1144 rpm, the motor is rotating at −4077 rpm. At −2342 rpm, the motor is rotating at 3114 rpm.

When the input shaft 230 rotates at a speed of between 1144 and 2342 rpm, the highest gearbox gear ratio rotates the output shaft of the gearbox (and the rotor to which it is coupled) at a respective speed of between 589 and 1206 rpm. For the middle gear ratio, this respective speed is between 391 and 800 rpm. For the lowest gear ratio, this respective speed is between 222 and 454 rpm. The output shaft speed varies with the motor speed.

When the motor rotates at −4077 rpm (and, again, assuming an engine speed of 2150 rpm), the rotor rotates at 589, 391, or 222 rpm, depending upon the gearbox 116 gear ratio. When the motor rotates at +3114 rpm, the rotor rotates at 1206, 800, or 454 rpm, depending upon the gear ratio.

Controller 234 achieves intermediate speeds within each of these three rotor speed ranges by varying the motor speed from −4077 to +3114 rpm. Controller 234 does this by controlling the specific displacement of pump 110 in the feedback control loop.

The operator is interested in controlling the rotor speed, since the rotor speed determines the rate at which the combine performs its work. It is for this reason that controller 234 is configured to transmit the rotor speed on the CAN bus to controller 238 to be displayed.

The operator cannot select any rotor speed, however, since the ranges of permissible rotor speeds are limited, as mentioned above. Each gearbox gear ratio has its own associated range of rotor speeds. As a result, the operator is also interested in knowing the range of rotor speeds that he can select. It is for this reason that controller 234 transmits the upper and lower rotor speed limits (which depend upon the currently selected gearbox gear ratio) on the CAN bus to controller 238 to be displayed.

Response to Gradual Load Changes

Controller 234 and the engine governor compensate for load changes by keeping the rotor running at a constant speed for a given commanded rotor speed using the feedback control loop. The only significant indication that the rotor is being loaded more heavily is the pressure in the hydraulic lines coupling the pump 110 to the motor 112. As controller 234 and the engine compensate for the increased load, the pressure in the hydraulic lines connecting the pump 110 and the motor 112 generally increases proportionately.

This additional pressure, in turn, causes the motor to apply a greater torque to the rotor through the drive system sufficient to counteract the increased load and keep the rotor turning at the commanded speed.

Thus, controller 234 changes the displacement of the hydraulic pump 110 to increase its output pressure when load on the rotor increases. If the load on the rotor is not extreme (such as when slugging occurs) the rotor will speed up to its commanded speed and controller 234 will reduce the pressure again to an appropriate level.

Response to Severe Load Changes and Motor Overspeeding

The system 108 above is responsive to gradual changes in load on the rotor. The system may not respond rapidly, however, to sudden or extreme load changes such as those that are sufficiently large to slug the rotor. When this happens, the engine can pop the pressure relief valve and accelerate the motor to a motor-damaging speed.

To prevent motor overspeeding, system 108 engages the engine-to-ring clutch when it determines the motor has passed a motor overspeed threshold speed. When the ring gear is disengaged from the engine, the engine can no longer apply a torque to the motor, the hydraulic fluid pressure developed in reaction to this torque disappears, the pressure relief valve (not shown) closes in the hydraulic circuit coupling the pump and the motor, and the motor returns to its commanded speed. This overspeed protection is supplemental to the feedback control loop described above.

In previous arrangements, system 108 determined the motor speed by reading the signal provided by the motor speed sensor. As described above, the signal varied considerably, leading to false-positive and false-negative errors.

In the arrangement illustrated herein, system 108 calculates the motor speed in two alternative ways using two alternative calculations. First, system 108 calculates the speed of the motor by reading the motor speed sensor and performing the appropriate calculations to convert it into a motor speed value. Second, system 108 calculates the speed of the motor by reading the engine speed sensor and the rotor speed sensor and performing appropriate calculations upon these ratings to convert them into a motor speed value.

System 108 then compares these two motor speed values with at least one threshold or reference speed that is outside the design operating range of speeds, but is below an engine-damaging speed. If both motor speed values are above the threshold speed for a predetermined time interval, system 108 disengages the engine-to-ring clutch.

Figure 3:
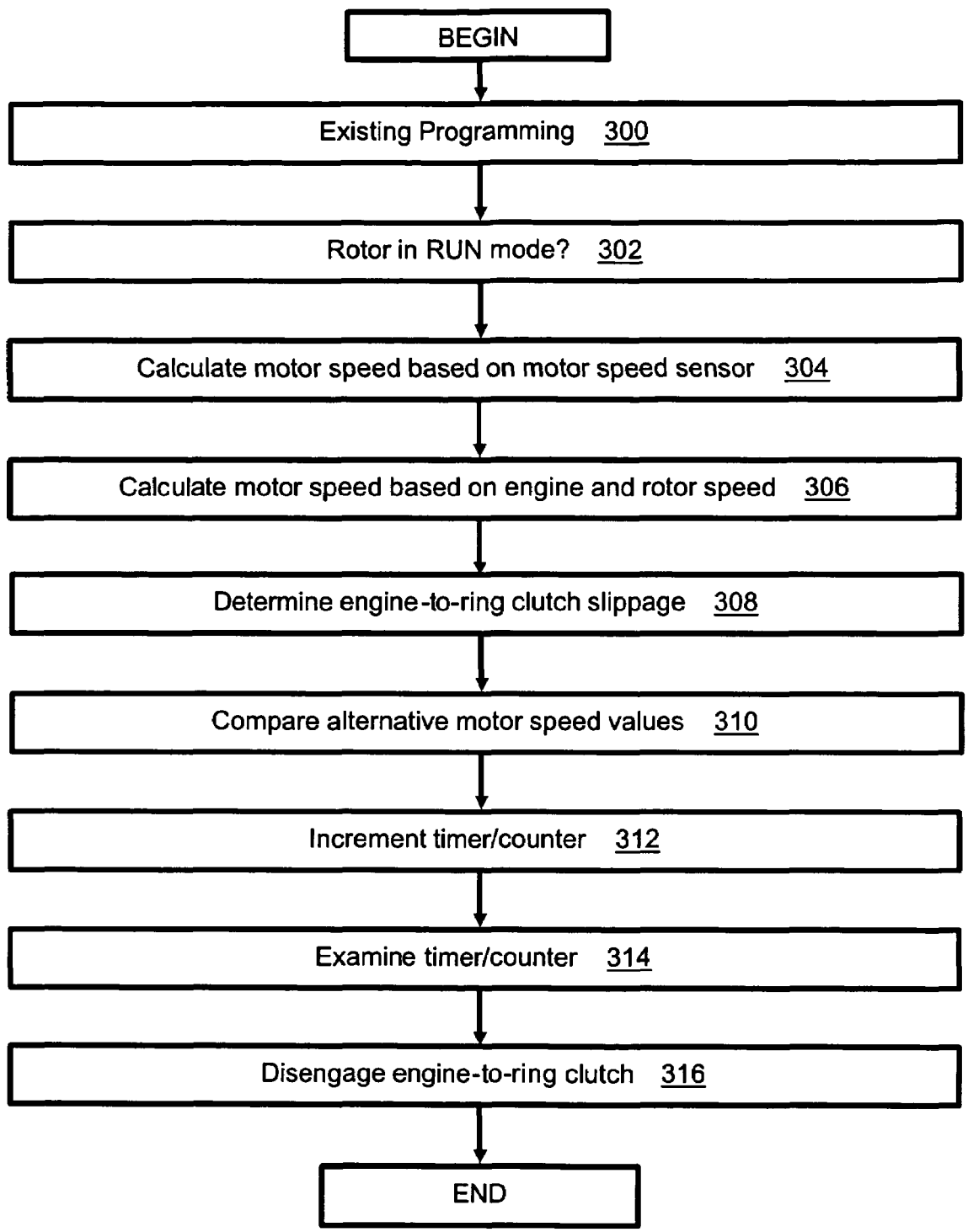
FIG. 3 is a flow chart illustrating a portion of the electronic control system operation.

FIG. 3 illustrates this process of preventing motor overspeeding by monitoring motor speed two different ways. The steps in this process are collectively performed by electronic controllers 234, 236, 238.

As a preliminary remark, it must be noted that the steps illustrated in FIG. 3 do not represent the entire process performed by system 108. They represent just a few of the steps, processes, or operations performed by system 108, in particular, the portion that determines whether the motor is overspeeding or not.

The steps illustrated in FIG. 3, like the other steps performed by the system, are repeated at regular intervals, preferably every 10 milliseconds. The system may perform the steps at different time intervals, either longer or shorter than the preferred 10 ms depending upon the system dynamics, the particular construction, and the capability of the electronic control circuits, among other considerations.

Step 300 in FIG. 3 represents the existing rotor control programming programmed into and performed by system 108. This programming includes the programs executed by system 108 to accelerate the rotor to a desired speed and maintain it at that speed using the feedback control algorithm discussed above, as well as any other programs necessary to operate the rotor. Related programs executed by system 108 are discussed in the related applications mentioned above, and therefore are not discussed herein in detail.

In step 302, system 108 checks to see whether the rotor has been accelerated to its desired operating steady-state speed and has stabilized. This is called the "RUN" state, and represents the operating state of the rotor drive system as it moves through an agricultural field, driven by the engine and motor, and harvests crops.

In step 304, system 108 calculates the speed of the motor based upon the signal provided by the motor speed sensor.

In step 306, system 108 calculates the speed of the motor based upon the signal is provided by the engine speed sensor and the rotor speed sensor. This is possible since the engine, the rotor, and the motor are coupled together by the planetary gear set. Planetary gear sets have three inputs: the ring gear, the sun gear, and the planet gears (or planet gear carrier or spider). If one knows any two of these three inputs, one can calculate the remaining input, given the defining characteristics of the planetary gear set—i.e. the diameters or numbers of teeth of each of the gears in the gear set. System 108 is programmed with these characteristics of the planetary gear set, and is configured to calculate one of the inputs (i.e. the motor speed which equals the sun gear speed) based upon the other to inputs (i.e. the engine speed provided by the engine speed sensor or engine governor, and the rotor speed provided by the rotor speed sensor).

In the preferred embodiment, the engine speed sensor and the rotor speed sensor are significantly filtered or damped as compared to the signal provided by the motor speed sensor. The speed signals they generate our not "noisy" like the signal from the motor speed sensor. The motor speed calculated from the engine and rotor speed signals is also filtered or damped as compared to the motor speed sensor signal.

In step 308, system 108 determines whether the engine-to-ring clutch is slipping. It does this by calculating the actual speed of the ring gear—the output of the engine-to-ring clutch 214—based upon the motor speed sensor signal and the rotor speed sensor signal. As explained above, in a planetary gear system if one knows two of the inputs one can calculate the third input. In this case, system 108 knows the motor speed (which is provided by the motor speed sensor) and also knows the rotor speed (which is provided by the rotor speed sensor). System 108 is further configured to calculate the ring gear speed based upon the motor speed sensor signal and the rotor speed sensor signal.

Clutch slip is the difference between the clutch input speed in the clutch output (i.e. ring gear) speed. Therefore, system 108 is also configured to calculate the speed of the input of the engine-to-ring clutch in order to calculate this difference.

It should be apparent that when there is no clutch slip the speed of the engine-to-ring clutch input and the speed of the engine-to-ring clutch output are identical. When the clutch slips, however, the two rotate at different speeds. This difference in speed is called the clutch "slip". The greater the slip, (i.e. the greater the relative movement between the input and the output side of the clutch, the greater the clutch wear. It should also be apparent that when the clutch is slipping, one cannot determine motor speed by combining the engine speed and the rotor speed using the planetary gear characteristics. There is no defined relation between engine speed, rotor speed, and motor speed when the clutch is slipping an unknown amount.

Once system 108 calculates the input and output speeds of the engine-to-ring clutch, it calculates the difference of the two to determine the amount of slip, and then compares the slip with a predetermined value (in this case preferably 50 rpm).

If the slip is greater than this predetermined value, system 108 is configured not to rely upon its calculation of the motor speed based upon the engine speed and the rotor speed. Instead, system 108 is configured to exit the motor overspeed determining process shown in FIG. 3 without disengaging the engine-to-ring clutch. By checking clutch slip in this manner, system 108 prevents the disengagement of the engine-to-ring clutch until the clutch no longer slips—or at least until the clutch slippage is below a predetermined threshold.

If the slip is less than the predetermined value, system 108 proceeds to step 310, in which it compares both of the alternative motor speed values to a predetermined value. In this case, the predetermined value is 4500 rpm.

If both of the alternative motor speed values are greater than 4500 rpm and the clutch did not slip greater than the predetermined value (see step 308), system 108 is configured to increment a timer/counter in step 312. On the other hand, if one or more of the alternative motor speed values are less than 4500 rpm, system 108 is configured to reset the timer/counter in step 312.

In step 314, system 108 is configured to examine the timer/counter and determine whether a predetermined time interval is passed based upon the value of the timer/counter. In the preferred embodiment, the time interval is 500 milliseconds, or one half of a second. Since system 108 is configured to loop through the instructions executing them once every 10 ms, 500 ms will have passed after 50 sequential executions of the instructions in FIG. 3. Thus, system 108 is configured to check whether the timer/counter equals 50.

If the timer/counter equals 50 in step 314, system 108 is configured to disengage the engine-to-ring clutch in step 316. Once the engine-to-ring clutch is disengaged, the engine and ring gear are free to rotate. The engine no longer applies the torque to the ring gear, and the ring gear no longer transfers that torque through the planetary gears to the sun gear and the motor. Since the engine torque is no longer coupled to the motor, the motor is free to return to its commanded speed, which is regulated by the feedback control process described above.

It will be obvious to those skilled in the art that various changes may be made without departing from the scope of the invention and the invention is not considered to be limited to what is illustrated in the drawings and described in the specification.

For example, any one or more of controllers of FIG. 2 can be configured to perform the overspeed determination illustrated in FIG. 3.

Further, the timer/counter can be set to any time interval desired in step 314; preferably one that will optimally reduce both false positives and false negatives.

Further, the threshold speed need not be 4500 rpm but can be greater or lower. The reason 4500 rpm is chosen in the present example is because of the particular characteristics of the motor used in this combine.

Further, more than one threshold speed can be used in step 310, with the first alternative speed being compared with one threshold speed and the second alternative speed being compared to a different threshold speed.

Further, the speed sensors need not be separate and independent speed sensors, but can be incorporated with other components such as an engine governor.

Further, the motor or rotor or engine speed signals need not be expressed in the computer program in any particular units. They may be expressed in radians per second, revolutions per minute, or in any other such units that are proportional to or indicative of motor, rotor, or engine speeds, respectively.

We claim:

1. A motor control system for a combine having a hydraulic motor and an internal combustion engine that are configured to be simultaneously coupled to and simultaneously drive a combine rotor, the system comprising:

at least one electronic controller configured to calculate at least two alternative first and second motor speed values, include a first threshold motor speed and a second wherein the first motor speed value is obtained from a motor speed sensor and wherein the second motor speed value is obtained from both an engine speed sensor and a rotor speed sensor and further wherein the electronic controller is configured to compare the first and second motor speed values with at least one threshold motor speed value and to disengage the motor from the engine when both alternative first and second motor speed values exceed the threshold motor speed value for a predetermined interval.

2. The system of claim 1, wherein the combine includes a planetary gear set coupling the engine and motor to the rotor, and a clutch coupled to and between the engine and the planetary gear set.

3. The system of claim 2, wherein the control system is configured to disengage the motor from the engine by disengaging the clutch.

4. The system of claim 1, wherein the electronic controller is configured to prevent disengagement of the motor when a clutch is slipping.

5. A method for controlling motor overspeed in a combine having a hydraulic motor and an internal combustion engine that are configured to be simultaneously coupled to and simultaneously drive a combine rotor, the method comprising the steps of:

electronically calculating at least two alternative first and second motor speed values, wherein the first motor speed value is obtained from a motor speed sensor and wherein the second motor speed value is obtained from both an engine speed sensor and a rotor speed sensor;

electronically comparing the first and second motor speed values with at least one threshold motor speed value, and disengaging the motor from the engine when both first and second motor speed values exceed the threshold motor speed value for a predetermined interval.

6. The method of claim 5, wherein the combine includes a planetary gear set coupling the engine and motor to the rotor and a clutch coupled to and between the engine and the planetary gear set.

7. The method of claim 6, wherein the step of disengaging the motor includes the step of disengaging the clutch.

8. The method of claim 5, further comprising the step of preventing disengagement of the motor when a clutch is slipping.

9. A motor control system for a combine having a hydraulic motor and an internal combustion engine that are configured to be simultaneously coupled to and simultaneously drive a combine rotor, the system comprising:

means for calculating at least two alternative first and second motor speed values, wherein the first motor speed value is obtained from a motor speed sensor and wherein the second motor speed value is obtained from both an engine speed sensor and a rotor speed sensor, means for comparing the first and second motor speed values with at least one threshold motor speed value, and means for disengaging the motor from the engine when both the first and second motor speed values exceed the threshold motor speed value for a predetermined interval.

10. The system of claim 9, wherein the combine includes a planetary gear set coupling the engine and motor to the rotor, and a clutch coupled to and between the engine and the planetary gear set.

11. The system of claim 10, further comprising means for disengaging the motor from the engine by disengaging the clutch.

* * * * *